United States Patent
Delp et al.

(10) Patent No.: US 10,215,861 B2
(45) Date of Patent: Feb. 26, 2019

(54) TRACK FOR VEHICLE ENVIRONMENT SENSORS

(71) Applicant: Toyota Motor Engineering & Manufacturing North America, Inc., Erlanger, KY (US)

(72) Inventors: Michael J. Delp, Ann Arbor, MI (US); John H. Marcoux, Ypsilanti, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 317 days.

(21) Appl. No.: 15/219,646

(22) Filed: Jul. 26, 2016

(65) Prior Publication Data

US 2018/0031706 A1    Feb. 1, 2018

(51) Int. Cl.
| | |
|---|---|
| *G01C 3/08* | (2006.01) |
| *G01S 17/93* | (2006.01) |
| *G01S 7/481* | (2006.01) |
| *G01S 17/42* | (2006.01) |

(52) U.S. Cl.
CPC ........... *G01S 17/936* (2013.01); *G01S 7/4811* (2013.01); *G01S 7/4813* (2013.01); *G01S 7/4817* (2013.01); *G01S 17/42* (2013.01)

(58) Field of Classification Search
CPC ..... G01S 17/936; G01S 7/4811; G01S 7/4817
USPC ......................................................... 356/4.01
See application file for complete search history.

(56) References Cited

U.S. PATENT DOCUMENTS

| | | | | |
|---|---|---|---|---|
| 6,882,321 | B2 * | 4/2005 | Tietjen ..................... | H01Q 3/08 343/757 |
| 2012/0119973 | A1 * | 5/2012 | Ahring ..................... | F41H 5/26 343/882 |
| 2014/0352757 | A1 | 12/2014 | Ramirez | |
| 2015/0185313 | A1 | 7/2015 | Zhu | |

* cited by examiner

*Primary Examiner* — Mark Hellner
(74) *Attorney, Agent, or Firm* — Christopher G. Darrow; Darrow Mustafa PC

(57) ABSTRACT

Arrangements related to sensing systems and methods are described. A sensing system can include a sensor track and one or more sensors. The sensor track can be operatively connected to a vehicle surface, such as at least a portion of a perimeter of a roof of a vehicle. The one or more sensors can be operatively connected to the sensor track such that the one or more sensors move along the sensor track while scanning an environment of the vehicle. The sensing systems can include a controller operatively connected to the one or more sensors to control the movement of the one or more sensors along the sensor track. The controller can also receive signals from the one or more sensors relating to the environment. In one or more arrangements, the one or more sensors can include LIDAR sensors.

18 Claims, 7 Drawing Sheets

TRACK FOR VEHICLE ENVIRONMENT SENSORS

FIELD

The subject matter described herein relates in general to sensor systems and, more particularly, to sensor systems that include a track for moveable sensors.

BACKGROUND

Some vehicles include an operational mode in which a computing system is used to navigate and/or maneuver the vehicle along a travel route with minimal or no input from a human driver. Such vehicles include sensors that are configured to detect information about the surrounding environment, including the presence of objects in the environment. In many instances, the vehicle can include sensors that are directed in different directions during the operation of the vehicle. The computing systems are configured to process the detected information to determine how to navigate and/or maneuver the vehicle through the surrounding environment.

SUMMARY

In one respect, the present disclosure is directed to a sensor system. The sensor system can include a sensor track. The sensor system can also include one or more sensors operatively connected to the sensor track. The one or more sensors can be moveable along the sensor track, and the one or more sensors can be configured to acquire sensor data of at least a portion of a surrounding environment. The sensor system further includes a controller operatively connected to the one or more sensors to selectively cause movement of the one or more sensors along the sensor track. The controller can be configured to receive the acquired sensor data. In one or more arrangements, the sensor system includes one or more LIDAR sensors.

In another respect, the present disclosure is directed to a sensor system for a vehicle. The system can include a vehicle and a sensor system. The sensor system can include a sensor track operatively connected to at least a portion of a perimeter of a roof of the vehicle. The sensor system can also include one or more LIDAR sensors operatively connected to the sensor track such that the one or more LIDAR sensors move along the sensor track while scanning an environment of the vehicle. The system can include a controller operatively connected to the one or more LIDAR sensors to control the movement of the one or more LIDAR sensors along the sensor track and receive signals from the one or more LIDAR sensors relating to the environment of the vehicle.

In yet another respect, the present disclosure is directed to a method of sensing an environment using sensors. The method can include causing a sensor to travel along a sensor track located along at least a portion of a perimeter of a roof of a vehicle. The method can also include scanning at least a portion of an environment of the vehicle using the sensor. The method can further include generating an output signal to control an aspect of the vehicle responsive to the scanning of the at least a portion of the environment of the vehicle.

DETAILED DESCRIPTION

Figure 1:
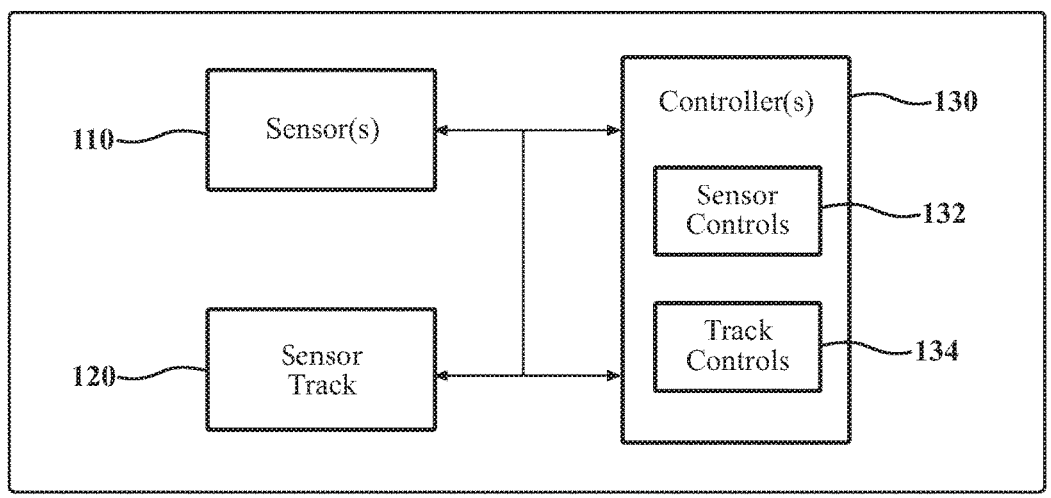
FIG. 1 is an example of a sensor system.

This detailed description relates to the sensing of an environment by sensors. More particularly, this detailed description relates to sensor systems having a sensor track, one or more sensors, and a controller. The sensors can be one or more LIDAR sensors. The sensor track can be attached to a surface of a vehicle. For example, the sensor track can be attached to at least a portion of a perimeter of a roof of a vehicle. The sensors can move along the sensor track while scanning an environment of the vehicle. The sensing systems can include a controller connected to the one or more sensors to control the movement of the sensors along the sensor track. The controller can also receive signals from the sensors relating to the environment. The present detailed description relates to systems, methods and computer program products that incorporate such features. In at least some instances, such systems, methods and computer program products can improve the sensing of an environment and object detection, thereby enhancing safety and/or performance of a vehicle. Additionally, arrangements described herein can improve vehicle aesthetics, increase vehicle performance, improve sensing areas, and/or improve accessibility to one or more roof features of a vehicle versus current larger center-mounted roof sensor systems.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a sensor system 100 is shown. The sensor system 100 can include one or more sensors 110. "Sensor" means any device, component and/or system that can detect, determine, assess, monitor, measure, quantify and/or sense something. The one or more sensors 110 can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process. In one or more arrangements, the sensor(s) 110 can be configured to acquire sensor data of a portion of a surrounding environment. Further, the sensor(s) 110 can be configured to send the acquired sensor data to one or more components or systems.

In one or more arrangements, the sensor(s) 110 can include one or more LIDAR sensors 111. While arrangements of the sensor system 100 can be shown and described as including LIDAR sensors, it is appreciated that other sensors can be included in the sensor system 100. As non-limiting examples, the one or more sensors 110 can include RADAR sensor(s), SONAR sensor(s), camera(s), and/or any other ranging sensor(s). The below description relating to LIDAR sensors can apply to other sensors in the sensor system 100.

The one or more LIDAR sensors 111 can use at least in part laser signals. The one or more LIDAR sensors 111 can be configured to detect, determine, assess, monitor, measure, obtain, quantify and/or sense, directly or indirectly, the presence of one or more objects in an environment. The one or more LIDAR sensors 111 can be used to also be configured to detect, determine, assess, monitor, measure, obtain, quantify and/or sense, directly or indirectly, information about such objects. Non-limiting and non-exhaustive examples of information about such objects can include the position, the speed, the range, the altitude, the direction, and/or the movement of detected objects. The one or more LIDAR sensors 111 may be configured to operate in a coherent or an incoherent detection mode.

Generally, the one or more LIDAR sensors 111 can include a transmitter. The transmitter can be can component or group of components that can transmit laser signals (e.g., laser light energy). As an example, the transmitter can be a laser, laser rangefinder, LIDAR, and/or laser scanner. The laser signals can have any suitable characteristics. In one or more arrangements, the laser signals can be from any suitable portion of the electromagnetic spectrum, such as from the ultraviolet, visible, or near infrared portions of the electromagnetic spectrum. The laser signals can be eye safe.

The laser signals can be transmitted into at least a portion of an environment The laser signals can impinge upon objects in the environment that are located in the path of the laser signals. Generally, when the laser signals impinge upon an object, a portion of the laser signals can be returned (e.g., by reflection). The returned portion of the laser signals can be detected by the LIDAR sensors, such as by a receiver (e.g., photodetectors, solid state photodetectors, photodiodes, or photomultipliers). Responsive to receiving the returned laser signals, the one or more LIDAR sensors can be configured to output signals.

In the arrangement shown in FIG. 1, the sensor system can include one type of sensor, such as LIDAR sensors. However, it will be understood that arrangements are not limited to there being only one type of sensors. Indeed, in one or more arrangements, there can be two or more different types of sensors. For example, the sensor system 100 can include LIDAR sensor(s) 111 and RADAR sensors and/or cameras. According to arrangements described herein, the plurality of different types of sensors can work in combination with each other. The plurality of different types of sensors can form a sensor network.

In one or more arrangements, the sensor system 100 can include a track, such as a sensor track 120. The sensor track 120 can be configured to allow the LIDAR sensor(s) 111 to move relative to the sensor track 120. For example, the LIDAR sensor(s) 111 can move along the sensor track 120 in a direction A, shown in FIG. 3. The sensor track 120 can be any suitable type. In one or more arrangements, the sensor track 120 can be configured to allow the LIDAR sensor 111 to move while in contact with one or more elements of the sensor track 120. For example, the sensor track can be implemented via a ball bearing track system. Alternatively or in addition, the sensor track can be configured to allow the LIDAR sensor 111 to move without direct contact with the sensor track 120. For example, the sensor track 120 can be implemented via an electromagnetic track, such as using maglev (magnetic levitation) technology.

In one or more arrangements, the sensor track 120 can be operatively connected, or configured to be operatively connected, to portions of a vehicle and/or the sensor(s) 110. The term "operatively connected," as used throughout this description, can include direct or indirect connections, including connections without direct physical contact. In some arrangements, the sensor track 120 can be operatively connected to a vehicle surface. For example, as described below, the sensor track 120 can be operatively connected to an outer, or perimeter, portion of a roof of a vehicle. Alternatively or in addition, the sensor track 120 can be positioned at other vehicle surfaces, such as a hood, side, door, trunk, rear hatch, front and/or rear bumpers, and/or any other suitable surface.

The one or more sensors 110 and/or the sensor track 120 can be operatively connected to one or more controllers 130. "Controller" means any component or group of components that are configured to perform any of the processes described herein relating to the sensor system 100. The controller 130 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The controller 130 can include at least one hardware circuit (e.g., an integrated circuit) configured to carry out instructions contained in program code. In arrangements in which there is a plurality of controllers 130, such controllers can work independently from each other or one or more controllers can work in combination with each other. In one or more arrangements, the controller(s) 130 can be included as part of a vehicle processor, such as the processor 110 described below.

The controller(s) 130 can be operatively connected to the sensor(s) 110 and/or the sensor track 120 via any suitable communication links. In some arrangements, the controller(s) 130 can be operatively connected via wired and/or wireless communication links. Alternatively or in addition, one or more elements of the sensor system 100 may act as a communication link. For example, the controller(s) 130 can send and/or receive signals to/from the sensor(s) 110 via communication ports embedded in the sensor track 120.

The controller(s) 130 can send and/or receive signals from the sensor(s) 110 and/or the sensor track 120. For example, the controller(s) 130 can receive signals from the LIDAR sensor(s) 111 including information relating to an environment scanned by the LIDAR sensor(s) 111. Alternatively or in addition, the controller(s) 130 can be configured to send and/or receive one or more signals to/from another system or component. As an example, the one or more signals can be sent to/from a processor of a vehicle. Signals sent by the controller(s) 130 to vehicle systems or components can be used by an autonomous vehicle to operate the vehicle in one or more autonomous or automated modes. The signals sent and/or received by the controller(s) 130 can have any suitable form. As an example, signals can be a modulated continuous-wave, a frequency-modulated continuous wave (FM-CW), or other wave form.

In one or more arrangements, the controller(s) 130 can include one or more control modules, including sensor controls 132 and/or track controls 134. The sensor controls 132 and/or the track controls 134 can include instructions (e.g., program logic) executable by the controller(s) 130. Such instructions can include instructions to execute various functions and/or to transmit data to, receive data from, interact with, and/or control the sensor(s) 110 and/or the sensor track 120.

Figure 2:
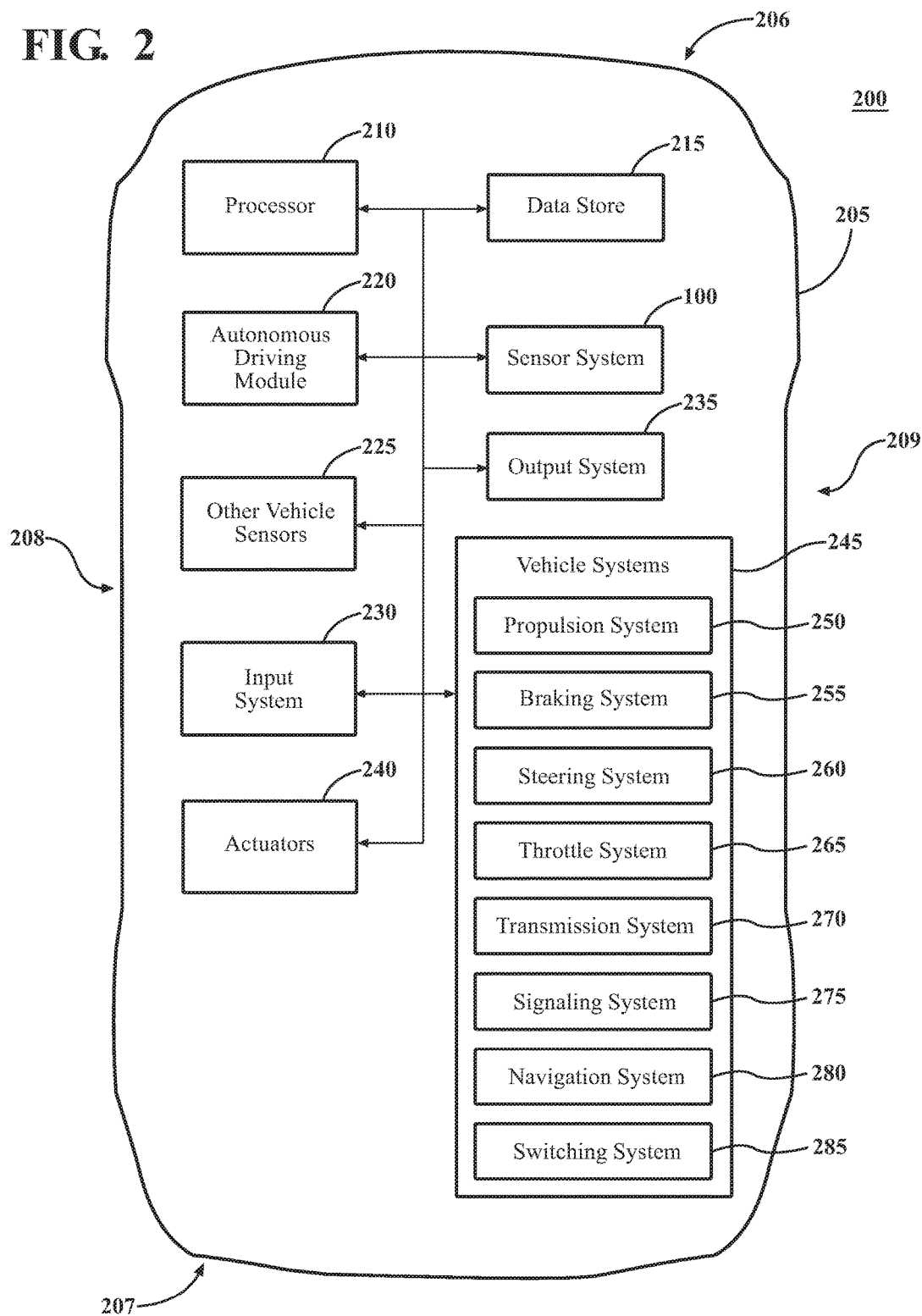
FIG. 2 is an example of a vehicle system including the sensor system of FIG. 1.

The sensor system 100 can be used in various applications. One example of a possible application of the sensor system 100 is shown in connection with FIG. 2. FIG. 2 is an example of a vehicle system 200 in which the sensor system 100 is used in a vehicular application. However, it will be understood that arrangements are not limited to the particular application shown.

An example a vehicle 205 is shown in FIG. 2. As used herein, "vehicle" means any form of motorized transport. In one or more implementations, the vehicle 205 can be an automobile. While arrangements will be described herein with respect to automobiles, it will be understood that embodiments are not limited to automobiles. In one or more implementations, the vehicle 205 may be a watercraft, an aircraft or any other form of motorized transport. The vehicle 205 can have a front end 206, a back end 207 and lateral sides 208, 209.

In one or more arrangements, the vehicle 205 can be an autonomous vehicle. As used herein, "autonomous vehicle" means a vehicle that configured to operate in an autonomous mode. "Autonomous mode" means that one or more computing systems are used to navigate and/or maneuver the vehicle along a travel route with different levels of input from a human driver. "Autonomous mode" includes full-autonomous modes in which no input from a human is required, and semi-autonomous modes where certain inputs from humans are required. In one or more arrangements, the vehicle 205 can be configured to be selectively switched between an autonomous mode and a manual mode. Such switching can be implemented in any suitable manner, now known or later developed. "Manual mode" means that a majority of the navigation and/or maneuvering of the vehicle along a travel route is performed by a human driver. In one or more arrangements, the vehicle 205 may operate in a manual mode, but one or more components and/or systems of the vehicle 205 can be autonomous. As an example, the vehicle 205 can include an adaptive cruise control system and/or an object alert system. Thus, while arrangements herein will be described in connection with an autonomous vehicle, it will be appreciated that arrangements described herein are not limited to autonomous vehicles.

The vehicle 205 can include various elements, some of which may be a part of an autonomous driving system. Some of the possible elements of the vehicle 205 are shown in FIG. 2 and will now be described. It will be understood that it is not necessary for the vehicle 205 to have all of the elements shown in FIG. 2 or described herein. The vehicle 205 can have any combination of the various elements shown in FIG. 2. Further, the vehicle 205 can have additional elements to those shown in FIG. 2. In some arrangements, vehicle 205 may not include one or more of the elements shown in FIG. 2. Further, while the various elements are shown as being located within the vehicle 205 in FIG. 2, it will be understood that one or more of these elements can be located external to the vehicle 205. Further, the elements shown may be physically separated by large distances.

The vehicle 205 can include one or more processors 210. "Processor" means any component or group of components that are configured to execute any of the processes described herein or any form of instructions to carry out such processes or cause such processes to be performed. The processor 210 may be implemented with one or more general-purpose and/or one or more special-purpose processors. The above description of example processors presented in connection with the controller(s) 130 applies equally to the one or more processors 210.

The vehicle 205 can include one or more data stores 215 for storing one or more types of data. The data store 215 can include volatile and/or non-volatile memory. Examples of suitable data stores 215 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 215 can be a component of the processor 210, or the data store 215 can be operatively connected to the processor 210 for use thereby.

The vehicle 205 can include an autonomous driving module 220. The autonomous driving module 220 can be implemented as computer readable program code that, when executed by a processor, implement one or more of the various processes described herein, including, for example, determining current driving maneuvers for the vehicle 205, future driving maneuvers and/or modifications. The autonomous driving module 220 can also cause, directly or indirectly, such driving maneuvers or modifications thereto to be implemented. The autonomous driving module 220 can be a component of the processor 210, or the autonomous driving module 220 can be executed on and/or distributed among other processing systems to which the processor 210 is operatively connected.

The autonomous driving module 220 can include instructions (e.g., program logic) executable by the processor 210. Such instructions can include instructions to execute various vehicle functions and/or to transmit data to, receive data from, interact with, and/or control the vehicle 205 or one or more systems thereof (e.g., one or more of vehicle systems 245). Alternatively or in addition, the data store 215 may contain such instructions.

The vehicle 205 can include other vehicle sensors 225. The other vehicle sensors 225 can include one or more sensors in addition to the sensor system 100. The other vehicle sensors 225 can be operatively connected to the processor 210, the data store 215, the autonomous driving module 220, the sensor system 100, and/or other element of the vehicle 205.

The vehicle 205 can include an input system 230. An "input system" is defined as any device, component, system, element or arrangement or groups thereof that enable information/data to be entered into a machine. The input system 230 can receive an input from a vehicle occupant (e.g., a driver or a passenger). Any suitable input system 230 can be used, including, for example, a keypad, display, touch screen, multi-touch screen, button, joystick, mouse, trackball, microphone and/or combinations thereof. In one or more arrangements, a user can use the input system 230 to access information relating to, and/or control, the sensor system 100.

The vehicle 205 can include an output system 235. An "output system" is defined as any device, component, system, element or arrangement or groups thereof that enable information/data to be presented to a vehicle occupant (e.g., a person, a vehicle occupant, etc.). The output system 235 can present information/data to a vehicle occupant. The output system 235 can include a display, as described above. Alternatively or in addition, the output system 235 may include a microphone, earphone and/or speaker. Some components of the vehicle 205 may serve as both a component of the input system 230 and a component of the output system 235. In one or more arrangements, the output system 235 can present information relating to the sensor system 100.

The vehicle 205 can include one or more vehicle systems 245. Various examples of the one or more vehicle systems 245 are shown in FIG. 2. However, the vehicle 205 can include more, fewer, or different vehicle systems. It should be appreciated that although particular vehicle systems are separately defined, each or any of the systems or portions thereof may be otherwise combined or segregated via hardware and/or software within the vehicle 205. The vehicle 205 can include a propulsion system 250, a braking system 255, a steering system 260, throttle system 265, a transmission system 270, a signaling system 275, a navigation system 280, and/or a switching system 285. Each of these systems can include one or more mechanisms, devices, elements, components, systems, and/or combination thereof, now known or later developed.

The processor 210 and/or the autonomous driving module 220 can be operatively connected to communicate with the various vehicle systems 245 and/or individual components thereof. For example, returning to FIG. 2, the processor 210 and/or the autonomous driving module 220 can be in communication to send and/or receive information from the various vehicle systems 245 to control the movement, speed, maneuvering, heading, direction, etc. of vehicle 205. The processor 210 and/or the autonomous driving module 220 may control some or all of these vehicle systems 245 and, thus, may be partially or fully autonomous.

The processor 210 and/or the autonomous driving module 220 may be operable to control the navigation and/or maneuvering of the vehicle 205 by controlling one or more of the vehicle systems 245 and/or components thereof. For instance, when operating in an autonomous mode, the processor 210 and/or the autonomous driving module 220 can control the direction and/or speed of the vehicle 205. The processor 210 and/or the autonomous driving module 220 can cause the vehicle 205 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 205 can include one or more actuators 240. The actuators 240 can be any element or combination of elements operable to modify, adjust and/or alter one or more of the vehicle systems 245 or components thereof to responsive to receiving signals or other inputs from any suitable source, including, for example, the controller(s) 130, the processor 210 and/or the autonomous driving module 220.

According to arrangements described herein, the vehicle 205 can be configured for determining and/or implementing any suitable driving action based on and/or using, at least in part, data/information received from the sensor system 100. For instance, data/information received from the sensor system 100 can be used to determine a current driving action, a future driving action, and/or a modification to a current or future driving action. As another example, data/information received from the sensor system 100 can be used to determine whether an alert or warning should be presented to an occupant of the vehicle 205 and/or to some other non-occupant of the vehicle 205.

Figure 3:
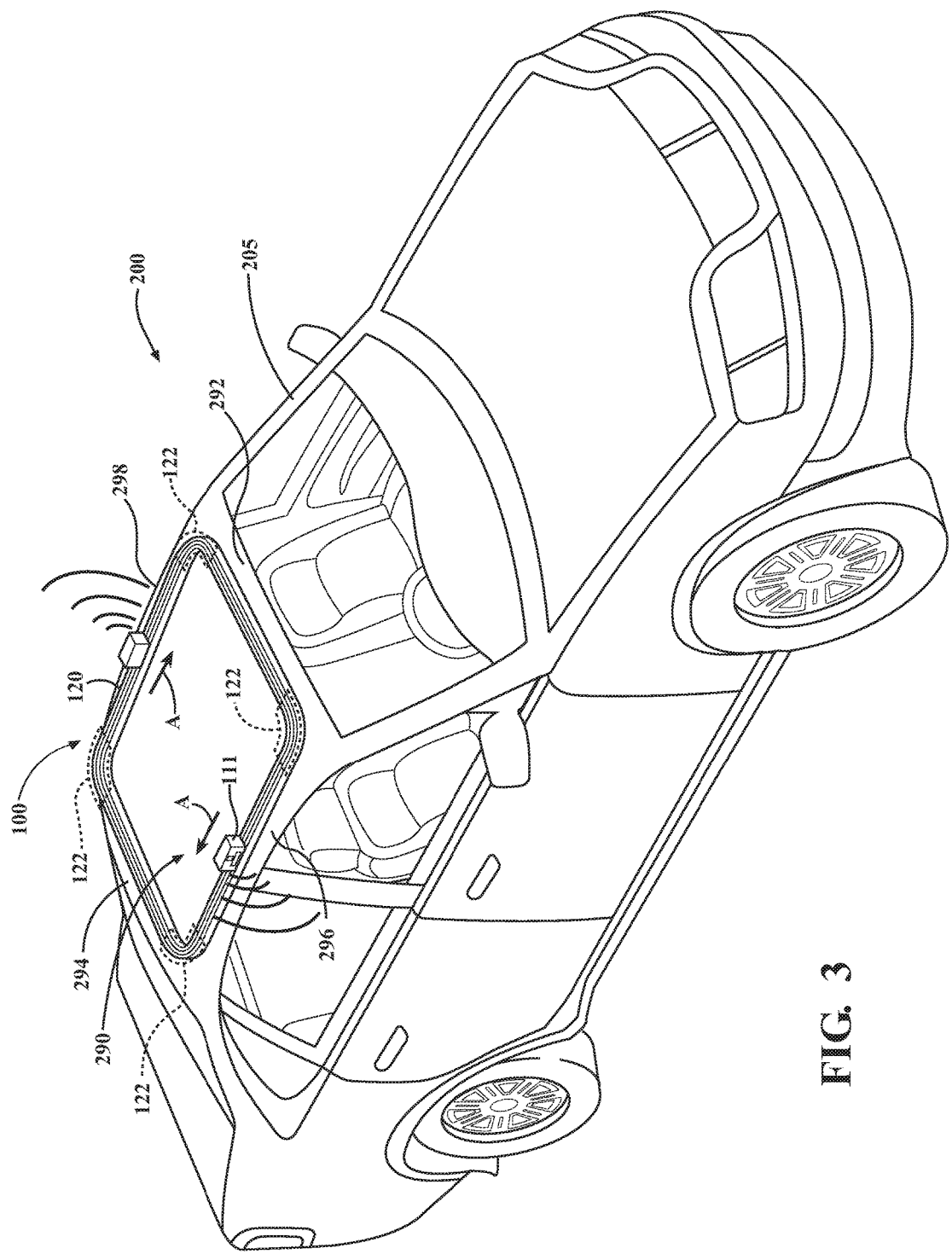
FIG. 3 shows a first example of a vehicle system having a sensor system.
Figure 4:
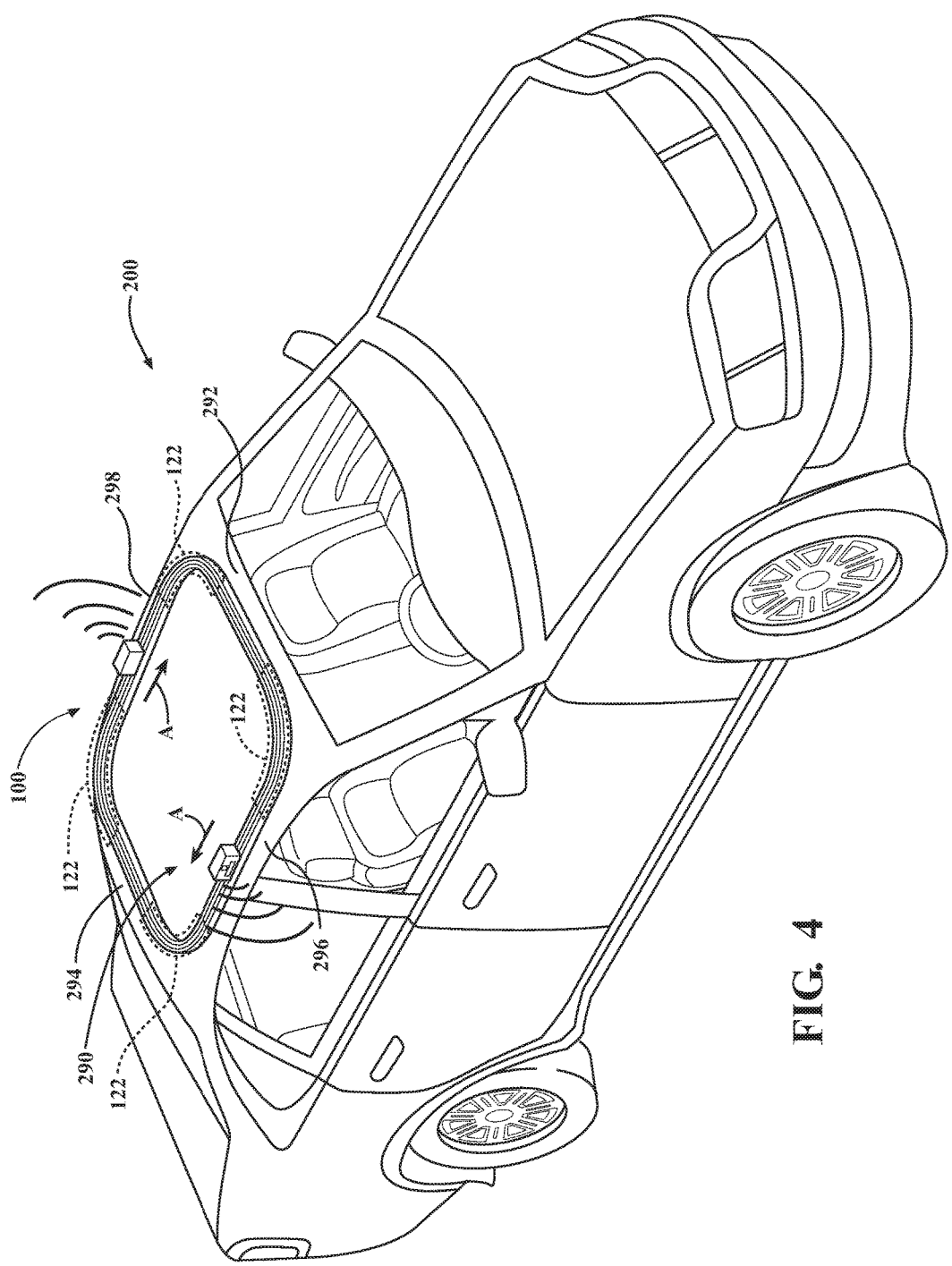
FIG. 4 shows a second example of a vehicle system having a sensor system.
Figure 5:
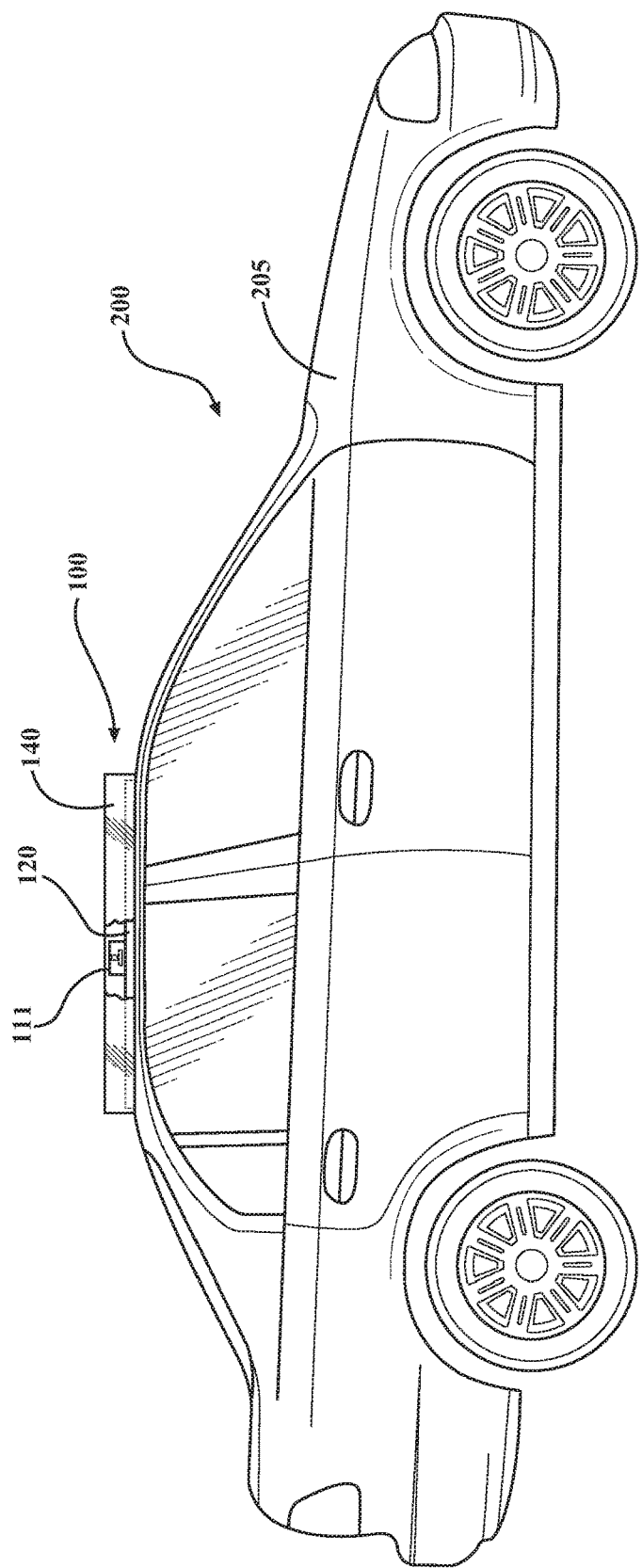
FIG. 5 shows a third example of a vehicle system having a sensor system.

FIGS. 3-5 show non-limiting examples of the vehicle system 200 with the sensor system 100. In one or more arrangements, portions of the sensor system 100 can be operatively connected to a roof 290 of the vehicle 205. For instance, the sensor track 120 can be located near a perimeter of the roof 290. As used herein, "perimeter," as used with reference to the roof 290, can include any outer portion of the roof 290. For example, the perimeter of the roof 290 can include portions near a side of the vehicle, near a windshield of a vehicle, and/or near a rear window and/or hatch of the vehicle. In one or more arrangements, the LIDAR sensor(s) 111 can sense surrounding environments below the LIDAR sensors 111 and along the sides of the vehicle 205. For instance, the positioning of the LIDAR sensors 11 near the perimeter of the roof can prevent situations in which the roof and/or sides of the vehicle block the LIDAR sensor(s) 111 from scanning such surroundings, which could occur with center-mounted roof LIDAR systems.

As mentioned previously, the sensor track 120 can have any suitable configuration. In one or more arrangements, the sensor track 120 can be operatively connected to the LIDAR sensor(s) 111 via direct contact. For example, the LIDAR sensor(s) 111 can be configured to travel along one or more slots, grooves, and/or channels defined within the sensor track 120. In one or more arrangements, the sensor track can be implemented via a ball bearing track system. For example, the LIDAR sensor(s) 111 can contact a plurality of ball bearings as the LIDAR sensor(s) 111 move along the sensor track 120. Alternatively or in addition, the sensor track can be configured to allow the LIDAR sensor 111 to move without direct contact with the sensor track 120, such as using magnetic levitation.

The LIDAR sensor(s) 111 can be caused to move along the sensor track 120 in any suitable manner. In one or more arrangements, the sensor system 100 can include a power source (not shown) and a propulsion source (not shown). For example, an electric motor can cause the LIDAR sensor(s) 111 to be moved along the sensor track 120. In one or more arrangements, the controller(s) 130 can operate and/or control the power source and/or propulsion source.

In one or more arrangements, the sensor track 120 can restrain or restrict the movement of the LIDAR sensor(s) 111. For instance, the LIDAR sensor(s) can be moveable translationally in a direction of the sensor track 120. In one or more arrangements, the LIDAR sensor(s) 111 can move along the sensor track 120 at any suitable orientation. The LIDAR sensor(s) 111 can, in some arrangements, move purely translational along the sensor track 120 without any rotation. For example, the LIDAR sensor(s) 111 can be facing outward away from a center portion of the vehicle 205, and change orientation relative to the vehicle 205 based solely on the sensor track 120 configuration. Alternatively or in addition, the LIDAR sensor(s) 111 can move in both translational and rotational aspects along the sensor track 120. For example, the LIDAR sensor(s) 111 can be configured to spin or rotate about an axis (e.g., a vertical axis) as it moves translationally along the sensor track 120.

In one or more arrangements, the sensor track 120 can be a closed loop track that allows continuous movement of one or more LIDAR sensors 111 in one direction. For example, the sensor track 120 can form a single loop as shown in FIGS. 3 and 4. In such arrangements, the LIDAR sensors 111 can have a 360 degree coverage around the vehicle 205. Alternatively, the sensor track 120 can include portions that do not form closed loops. For example, the sensor track 120 can include one or more linear portions of track that terminate at one or both ends.

The sensor track 120 can have any suitable size, shape, and/or configuration. In some arrangements, the sensor track 120 can be a rounded rectangular shape when viewed from above, as shown in FIGS. 3 and 4. For example, the sensor track 120 can include a plurality of substantially straight sides, with corner portions 122 connecting the sides. However, the sensor track 120 is not limited to this shape. Indeed, the sensor track 120 can be substantially triangular, parallelogram-shaped, trapezoidal, circular, oval, polygonal, "X" shaped, line segments, or irregular, just to name a few possibilities.

The sensor system 100 can include any suitable amount of sensors. As non-limiting examples, the sensor system 100 can include one, two, three, four, five, or six LIDAR sensors 111. The amount of sensors can be based on one or more factors. For example, the amount of LIDAR sensors 111 can be based on cost, scanning characteristics, and/or vehicle characteristics. In some arrangements, the amount of LIDAR sensors 111 in the sensor system 100 can be based on the speed at which each LIDAR sensor 111 can move about the sensor track 120. For example, at slower speeds, more LIDAR sensors 111 may be desired to obtain a level of coverage. At high speeds, less LIDAR sensors 111 may be desired to obtain a similar level of coverage.

In arrangements having two or more LIDAR sensor(s) 111, the spacing between each LIDAR sensor 111 can be any suitable distance. The spacing can be continuous, periodic, irregular, or even random. In some arrangements, the two or more LIDAR sensors 111 can be moved along the sensor track 120 such that the distance along the sensor track 120 between each LIDAR sensor 111 remains constant. Alternatively or in addition, the distance between two or more LIDAR sensors 111 can vary. In one or more arrangements, the two or more LIDAR sensors 111 can be equidistantly spaced along the sensor track 120. As used herein, "equidistant" can mean spaced at equal distances as measured along the sensor track 120. FIG. 3, for example, shows two LIDAR sensors 111 equidistant to each other on the sensor track 120. Alternatively or in addition, the spacing of the LIDAR sensor(s) 111 can be dependent on one or more factors. In some arrangements, the spacing of the LIDAR sensor(s) 111 can be based on characteristics of the vehicle 205. For instance, the direction of travel of the LIDAR sensor(s) 111 can be based on the speed, location, roadway, operational mode, orientation, and/or any other characteristic of the vehicle 205.

The LIDAR sensor(s) 111 can move along the sensor track 120 in any suitable direction. The direction can be continuous, periodic, irregular, or even random. For example, the LIDAR sensor(s) 111 can be controlled to move in one constant direction, such as direction A as shown in FIG. 3. In arrangements not having closed loop tracks, the direction of the LIDAR sensor(s) 111 can alternate. Alternatively, the direction of the LIDAR sensor(s) 111 can be dependent on one or more factors. In some arrangements, the direction of travel of the LIDAR sensor(s) 111 can be based on characteristics of the vehicle 205. For instance, the direction of travel of the LIDAR sensor(s) 111 can be based on the speed, location, roadway, operational mode, orientation, and/or any other characteristic of the vehicle 205.

The LIDAR sensor(s) 111 can move along the sensor track 120 at any suitable speed. The speed can be continuous, periodic, irregular, or even random. For example, the LIDAR sensor(s) 111 can be controlled to move at a constant and predetermined speed. Alternatively or in addition, the speed of the LIDAR sensor(s) 111 can be dependent on one or more factors. In some arrangements, the speed of the LIDAR sensor(s) 111 can be based on a location of the LIDAR sensor 111 relative to the sensor track 120. For example, the speed of the LIDAR sensor(s) 111 can be decreased in the corner portions 122 of the sensor track 120 to improve stability and/or durability of the system. In one or more arrangements, the speed of the LIDAR sensor(s) 111 can be based upon the amount of LIDAR sensor(s) 111 in the sensor system 100. For example, the speed may be higher for a lower amount of LIDAR sensor(s) 111 as compared to a sensor system 100 having a higher amount of LIDAR sensor(s) 111. In some arrangements, the speed of the LIDAR sensor(s) 111 can be based on the scanning characteristics of the LIDAR sensor(s) 111. For example, the speed of the LIDAR sensor(s) 111 can be altered based on a frequency of oscillation of one or more laser energy beams being emitted by each LIDAR sensor 111. Further, the speed of the LIDAR sensor(s) 111 can be based on characteristics of the vehicle 205. For instance, the speed of the LIDAR sensor(s) 111 can be based on the speed, location, roadway, operational mode, orientation, and/or any other characteristic of the vehicle 205.

In one or more arrangements, the corner portions 122 of the sensor track 120 can be configured to allow faster travel of the LIDAR sensor(s) 111. For example, as shown in FIG. 4, the corner portions 122 can include gentler turns, each having a larger radius (as compared to the corner portions 122 of the sensor track 120 shown in FIG. 3). Such arrangements can allow the LIDAR sensor(s) 111 to travel through the corner portions 122 at higher speeds.

In one or more arrangements, the sensor system 100 can include a cover 140 to protect one or more components. Referring to FIG. 5, the cover 140 can cover one or more of the LIDAR sensor(s) 111 and/or the sensor track 120. In some arrangements, the cover 140 can protect the LIDAR sensor(s) 111 and/or the sensor track 120 from weather elements and/or debris. Further, the cover 140 can reduce air friction acting on parts of the system, such as the moving LIDAR sensor(s) 111.

The cover 140 can have any suitable configuration. In some arrangements, the cover 140 can extend along the roof 290 of the vehicle 205 in substantially the same shape as the sensor track 120. Alternatively, the cover 140 can have different shapes. For example, the cover 140 can extend over parts of, or the entirety, of the roof 290. The cover 140 can be of any suitable material. In one or more arrangements, the cover 140 can be a distortion-less glass and/or polymer.

Figure 6:
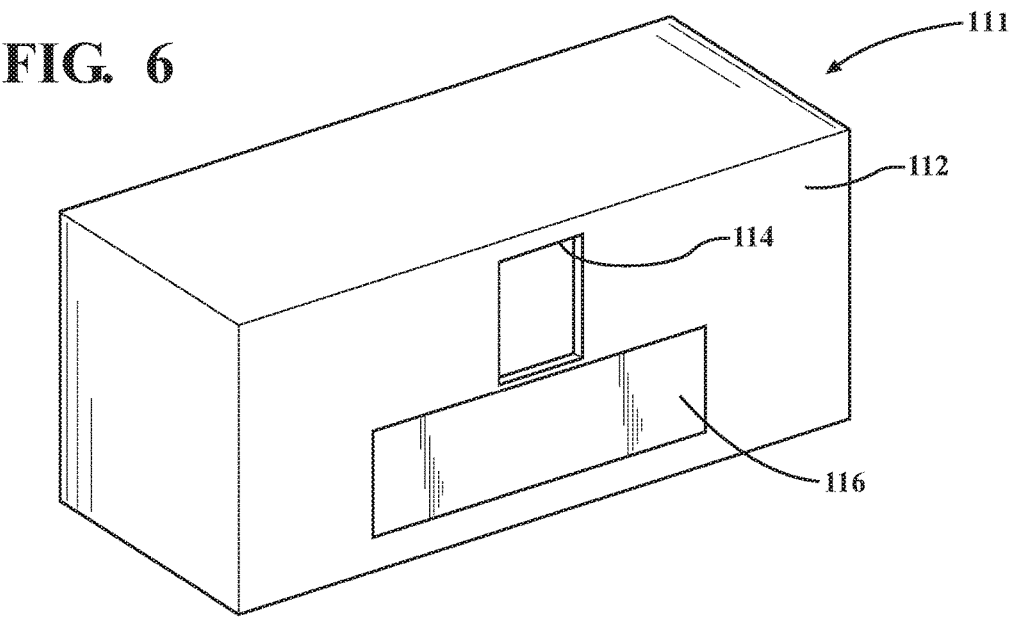
FIG. 6 is an example of a LIDAR sensor.

Referring to FIG. 6, an example of a LIDAR sensor 111 for the sensor system 100 is shown. In one or more arrangements, the LIDAR sensor 111 can include a housing 112.

The housing 112 can be any suitable shape. In one or more arrangements, the housing 112 can be substantially rectangular, as is shown in FIG. 6. However, the housing 112 is not limited to this shape. Indeed, the housing 112 can be substantially triangular, parallelogram, trapezoidal, circular, oval, polygonal, or irregular, just to name a few possibilities. The housing 112 can be made of one or more suitable materials, including, for example, metals, polymers, resins, composites or plastics. In one or more arrangements, the housing 112 can be made of a material that does not interfere with or minimizes interference with the operation of the one or more LIDAR sensors 111, including the transmitting and receiving of their respective signals.

In one or more arrangements, the housing 112 can include an aperture 114. The aperture 114 can be provided to allow laser energy emitted from the one or more LIDAR sensors 111 to be emitted from and/or received by the LIDAR sensors 111. The aperture 114 can have any suitable size and/or shape. In one or more arrangements, the aperture 114 can be at least partially closed by a window element (not shown). The window element can be a lens or other element through which at least laser signals can be transmitted and received. The window element can be configured so as not to alter the characteristics of laser signals emitted from or received by the one or more LIDAR sensors 111.

In one or more arrangements, the LIDAR sensor 111 can include one or more receivers 116 to receive laser energy emitted from the LIDAR sensor(s) 111. As used herein, "receiver" can include any device and/or system configured to detect, measure, assess, and/or otherwise acknowledge the presence of portion of energy emitted from one or more sensors. The receiver(s) 116 can include any suitable receiver technology presently-known or developed in the future. For example, the receiver(s) 116 can include photodetectors such as solid state photodetectors, silicon avalanche photodiodes, and/or photomultipliers.

The receiver(s) 116 can be located at any suitable location within the LIDAR sensor 111. In one or more arrangements, the receiver 116 can be located near the aperture 114 such that the laser energy is emitted and received from substantially the same location within the LIDAR sensor 111. Alternatively or in addition, the receiver(s) 116 can be offset relative to the aperture 114. For example, as shown in FIG. 6, the receiver 116 can be located below the aperture 114. In some arrangements, the receiver 116 can be located laterally offset from the aperture 114. For example, the receiver 116 can be located laterally offset from the aperture 114 in an opposite direction of the travel of the LIDAR sensor 111. Such arrangements can, for example, take into account the moving of the LIDAR sensor 111 to position the receiver 116 in substantially the same position as the laser energy is being emitted as the LIDAR sensor 111 moves along the sensor track 120.

Figure 7:
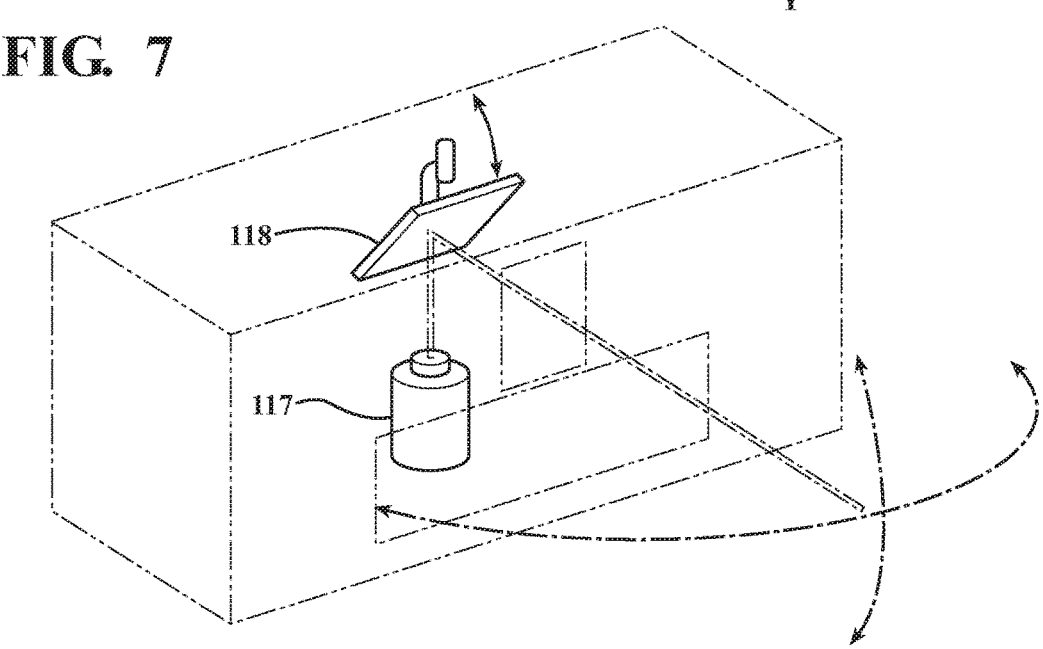
FIG. 7 is an example of a LIDAR sensor showing internal components.

The laser energy can be emitted from the LIDAR sensor 111 in any suitable manner. Referring to FIG. 7, an example of a laser generator 117 and a reflector 118 is shown. In one or more arrangements, the laser energy can be generated by the laser generator 117. The laser generator 117 can be any suitable laser. For example, the laser can be those configured to emit wavelengths from 600-1000 nanometers (nm). The laser generator 117 can be at any suitable location and/or orientation within the LIDAR sensor 111. For example, the laser generator 117 can be orientated such that laser energy is directed upward towards the reflector 118.

In one or more arrangements, the reflector 118 can direct laser energy emitted by the LIDAR sensor 111. The reflector 118 can have any suitable configuration that allows for the direction of the laser energy. In one or more arrangements, the reflector 118 can be a prism. Alternatively or in addition, the reflector 118 can be a mirror. The reflector 118 can be at any suitable location and/or orientation within the LIDAR sensor 111. For example, the reflector 118 can be orientated such that laser energy is directed upward from the laser generator 117 towards the reflector 118 as shown in FIG. 7.

In one or more arrangements, the reflector 118 can be configured to rotate, move, oscillate, or otherwise change orientation within the LIDAR sensor 111. By changing orientation, the reflector 118 can direct the laser energy in different directions relative to the LIDAR sensor 111. The reflector 118 can rotate and/or move about any axis, including the x, y, and z axes shown above the LIDAR sensor 111 in FIG. 7. The moving can be performed continuously, periodically, irregularly, or even randomly.

In one or more arrangements, the change in orientation of the reflector 118 can change an angle of a reflective surface relative to the laser generator 117. In some arrangements, the reflector can be pivotally oscillated about one or more of the axes x, y, or z. For example, the reflector can be configured to pivotally oscillate in substantially a vertical direction, resulting in the laser energy being directed in directions that change in a substantially vertical direction relative to the LIDAR sensor 111. Alternatively or additionally, the reflector 118 can be pivotally oscillated in different directions.

The oscillation of the reflector 118 can have any suitable frequency. The frequency of oscillation can be continuous, periodic, irregular, or even random. For example, the reflector 118 can be pivotally oscillated about a constant predefined frequency. Alternatively or in addition, the frequency of oscillation can be dependent on other factors. In some arrangements, the frequency of oscillation can be based on a location of the LIDAR sensor 111 relative to the sensor track 120. For example, the frequency of oscillation can increase and/or decrease when the LIDAR sensor 111 is at particular locations of the sensor track 120. In some arrangements, the frequency of oscillation can be based on a speed of movement of the LIDAR sensor 111 along the sensor track 120. For example, the frequency of oscillation can increase and/or decrease as the LIDAR sensor 111 increases or decreases speed along the sensor track 120.

The oscillation of the reflector 118 can be through any suitable angle of rotation. In one or more arrangements, the angle of rotation of the reflector 118 substantially corresponds to a change in angle of a beam of laser energy. The angle of rotation can be continuous, periodic, irregular, or even random. The reflector 118 can be pivotally oscillated through a rotation angle that is predefined. For example, the rotation angle can be substantially constant and predetermined. Alternatively or in addition, the frequency of oscillation can be dependent on other factors. In some arrangements, the angle of rotation can be based on a location of the LIDAR sensor 111 relative to the sensor track 120. For example, the angle of rotation can increase and/or decrease when the LIDAR sensor 111 is at particular locations of the sensor track 120. In some arrangements, the angle of rotation can be based on a speed of movement of the LIDAR sensor 111 along the sensor track 120. For example, the angle of rotation can increase and/or decrease as the LIDAR sensor 111 increases or decreases speed along the sensor track 120.

In one or more arrangements, the LIDAR sensor 111 can be configured to rotate, move, oscillate, or otherwise change orientation with respect to one or more elements as the LIDAR sensor 111 moves along the sensor track 120. In some arrangements, the LIDAR sensor 111 can oscillate during operation. For example, the LIDAR sensor 111 can pivotally oscillate such that the aperture 114 is directed up and down as the LIDAR sensor 111 moves along the sensor track 120. The LIDAR sensor 111 can move while the reflector 118 stays stationary. Alternatively or in addition, the LIDAR sensor 111 and the reflector 118 can move together during operation.

Figure 8:
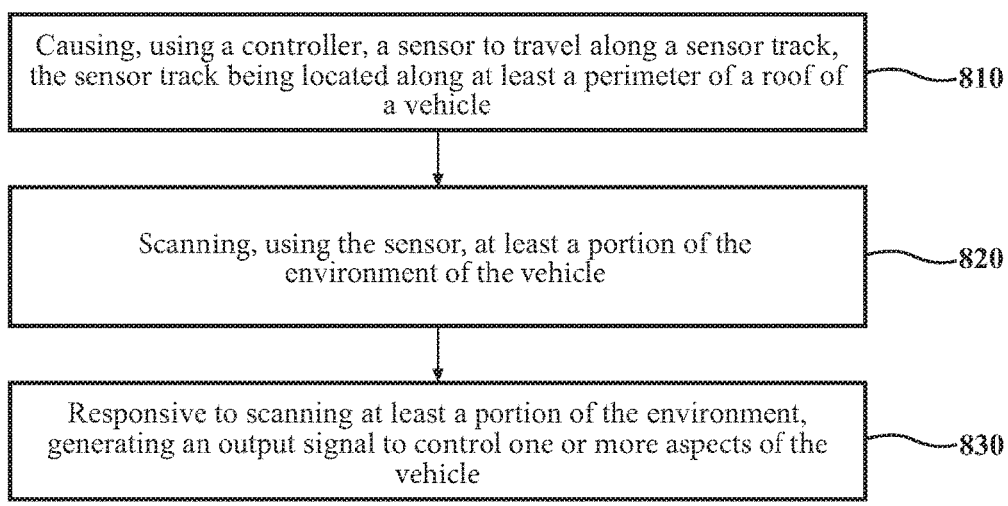
FIG. 8 is a method of sensing an environment using the sensor system of FIG. 1.

Now that the various potential systems, devices, elements and/or components of the sensor system 100 have been described, various methods for using the sensor system 100, including in connection with a vehicle 205, will be described below. Referring to FIG. 8, an example of a method 800 of sensing an environment is shown. Various possible steps of method 800 will now be described. The method 800 illustrated in FIG. 8 may be applicable to the embodiments described above in relation to FIGS. 1-7, but it is understood that the method 800 can be carried out with other suitable systems and arrangements. Moreover, the method 800 may include other steps that are not shown here, and in fact, the method 400 is not limited to including every step shown in FIG. 8. The steps that are illustrated here as part of the method 800 are not limited to this particular chronological order. Indeed, some of the steps may be performed in a different order than what is shown and/or at least some of the steps shown can occur simultaneously.

At block 810, a sensor can be caused to travel along a track. The track can be located along at least a perimeter of a roof of a vehicle. In one or more arrangements, the sensor track 120 can extend around the roof 290 of the vehicle 205. The sensor can be a LIDAR sensor. In some arrangements, the causing can be done by the sensor controls 132 and/or the track controls 134 of the controller(s) 130. The method can continue to block 820.

At block 820, the sensor can be caused to scan at least a portion of the environment. "Scanning" includes transmitting a signal and/or receiving a returned signal. The scanning of at least a portion of the environment can occur in response to the controller(s) 130 activating the LIDAR sensor(s) 111. Any suitable form of scanning can be performed. In some arrangements, the scanning can include directing a beam of light in different directions relative to the LIDAR sensor. For example, the LIDAR sensor 111 can be configured to change the direction of the light beam as shown in FIG. 7 and described above. The causing can be done by the sensor controls 132 and/or the track controls 134 of the controller(s) 130. The method can continue to block 830.

At block 830, an output signal can be generated by one or more controllers, in response to scanning at least a portion of the environment. The output signal can be to control one or more aspects of the vehicle. In one or more arrangements, the LIDAR sensor(s) 111 and/or the controller(s) 130 can generate the output signal. The output signal can be sent to one or more components of a vehicle. For instance, the output signal can be sent to the processor 210, the data store 215, the autonomous driving module 220, and/or the vehicle systems 245. In some arrangements, the output signal can be used to autonomously operate the vehicle 205. The method 800 can end. Alternatively, the method 800 can return to block 810. Alternatively, the method 800 can include additional blocks.

It will be appreciated that arrangements described herein can provide numerous benefits, including one or more of the benefits mentioned herein. Many current LIDAR systems for vehicles include a large sensor system mounted above the center portion of the roof. Arrangements described herein provide several benefits by positioning sensors near a perimeter portion of the vehicle. For example, arrangements described herein can increase the robustness and accuracy of a sensor system by allowing sensors to travel about a predefined path via a track. In some arrangements, the track can be located along a perimeter of a roof of a vehicle. Arrangements described herein can reduce aerodynamics and improve aesthetics over larger center-roof mounted LIDAR systems. For example, air drag can be reduced by positioning LIDAR sensors individually and closer to the vehicle. Further, arrangements can reduce or eliminate blind spots from scanning the environment. For example, by placing the sensors close to the sides of the vehicle rather than farther inward at the roof, the sensors can have better access to the sides of the vehicle without being blocked by portions of the roof and/or sides of the vehicle. Arrangements described herein can provide flexibility to a LIDAR system, by allowing the number of sensors, the speed at which the sensors move, and/or the speed and coverage of the beam of light can all be adjusted for particular applications. Further, arrangements described herein can allow the use of, access to, roof features such as a roof rack, sun roof, moon roof, and/or cargo containers.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A sensor system comprising:
    a sensor track, wherein the sensor track is configured for operative connection to a vehicle surface, wherein the vehicle surface includes a perimeter portion of a vehicle roof such that the one or more sensors can acquire sensor data of a surrounding environment next to a vehicle;
    one or more sensors operatively connected to the sensor track, the one or more sensors moveable along the sensor track, and the one or more sensors configured to acquire sensor data of at least a portion of a surrounding environment; and
    a controller operatively connected to the one or more sensors to selectively cause movement of the one or more sensors along the sensor track, the controller configured to receive the acquired sensor data.

2. The sensor system of claim 1, wherein the one or more sensors are one or more LIDAR sensors.

3. The sensor system of claim 1, including two or more sensors, the two or more sensors being equidistant from one another along the sensor track.

4. The sensor system of claim 1, wherein the sensor track includes a plurality of ball bearings configured to contact a portion of the one or more sensors.

5. The sensor system of claim 1, wherein the sensor track uses magnetic levitation to allow the one or more sensors to move along the sensor track.

6. The sensor system of claim 2, wherein each of the one or more LIDAR sensors generate an oscillating laser energy beam having an oscillating frequency.

7. The sensor system of claim 6, wherein the oscillating frequency is dependent on a speed of the movement of the LIDAR sensor along the sensor track.

8. The sensor system of claim 1, wherein the system is configured to reduce a speed of the movement of the one or more sensors in corner portions of the sensor track.

9. A sensor system for a vehicle, the system comprising:
    a vehicle having a roof;
    a sensor system including:
        a sensor track operatively connected to at least a portion of a perimeter of the roof of the vehicle; and
        one or more LIDAR sensors operatively connected to the sensor track such that the one or more LIDAR sensors are configured to move along the sensor track to scan an environment of the vehicle; and
    a controller operatively connected to the one or more LIDAR sensors to control a movement of the one or more LIDAR sensors along the sensor track and receive signals from the one or more LIDAR sensors relating to the environment of the vehicle.

10. The system of claim 9, wherein the sensor track is a closed loop track extending substantially around the perimeter of the vehicle roof.

11. The system of claim 9, including two or more LIDAR sensors, the two or more LIDAR sensors being equidistant from one another along the sensor track.

12. The system of claim 9, wherein the sensor track is one of a ball bearing or magnetic levitation track.

13. The system of claim 9, wherein each of the one or more LIDAR sensors generate an oscillating laser energy beam having an oscillating frequency.

14. The system of claim 13, wherein the oscillating frequency is dependent on a speed of the movement of the LIDAR sensor along the sensor track.

15. The system of claim 9, wherein the vehicle is an autonomous vehicle, the autonomous vehicle including one or more actuators operatively connected to one or more vehicle systems to implement driving maneuvers, wherein the actuators are operatively connected to the controller, and wherein the driving maneuvers are implemented based on signals received from the controller.

16. A method of sensing an environment using sensors comprising:
    causing, using a controller, a sensor to travel along a sensor track located along at least a portion of a perimeter of a roof of a vehicle;
    scanning, using the sensor, at least a portion of an environment of the vehicle; and responsive to the scanning of the at least a portion of the environment of the vehicle, generating an output signal to control one or more aspects of the vehicle.

17. The method of claim 16, wherein the sensor is a LIDAR sensor and scanning the portion of the environment of the vehicle includes causing the LIDAR sensor to generate an oscillating laser energy beam.

18. The method of claim 16, wherein causing the LIDAR sensor to travel along the sensor track includes controlling a speed along the sensor track based on a position of the LIDAR sensor along the sensor track.

* * * * *